Aug. 15, 1961   W. E. PHILLIPS   2,996,465
RESIN CURED BUTYL COMPOSITION AND ARTICLE
Filed Feb. 13, 1959   2 Sheets-Sheet 1

FIG. I.

United States Patent Office 2,996,465
Patented Aug. 15, 1961

2,996,465
RESIN CURED BUTYL COMPOSITION AND ARTICLE
Warren E. Phillips, Cuyahoga Falls, Ohio, assignor to The Firestone Tire & Rubber Company, Akron, Ohio, a corporation of Ohio
Filed Feb. 13, 1959, Ser. No. 792,997
15 Claims. (Cl. 260—27)

This invention relates to improved butyl rubber compositions and more particularly to butyl rubber compositions having greatly improved hot aging and flex resistant characteristics.

It has been found previous to the present invention that the heat aging resistance of butyl rubber is greatly improved by vulcanizing such rubber with a monomeric or resinous 2,6-dimethylol-4-hydrocarbon substituted phenol, and more specifically that butyl rubber may be cured with such phenolic monomers and resins in combination with chlorine liberating chemicals which accelerate the vulcanization of the composition.

Such compositions have extensive use in curing elements such as bladders used to contain steam and hot water inside pneumatic tires during the vulcanization operation. However, the continuous flexing to which such elements are subjected in hot atmosphere eventually causes rupture of the walls of these elements at locations of greatest strain. The present invention increases the flex life and hot age resistance of butyl compositions used in such elements.

It is, therefore, an object of the present invention to provide an improved butyl rubber composition. Yet a further object of the invention is to provide an improved composition of matter comprised of butyl rubber, phenol aldehyde resin and a coniferous softener.

Figure 1:
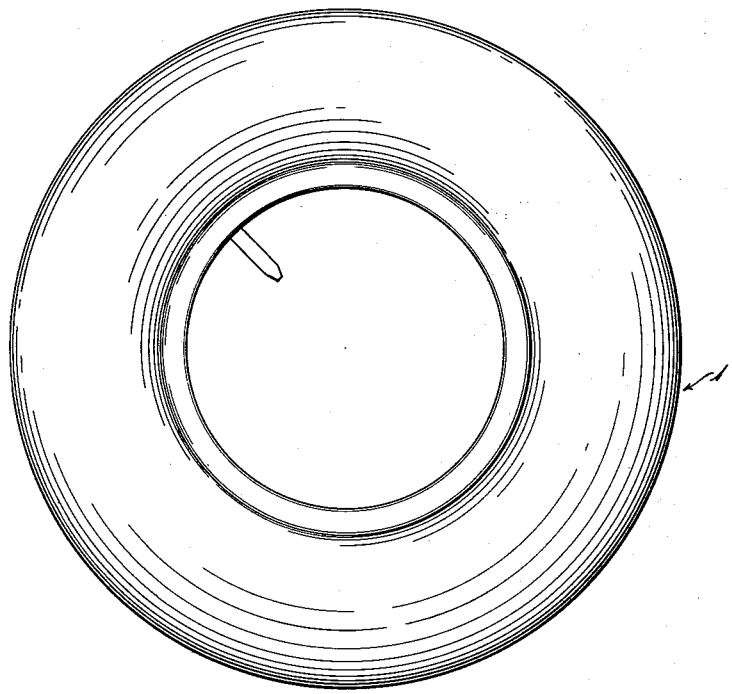
Figure 2:
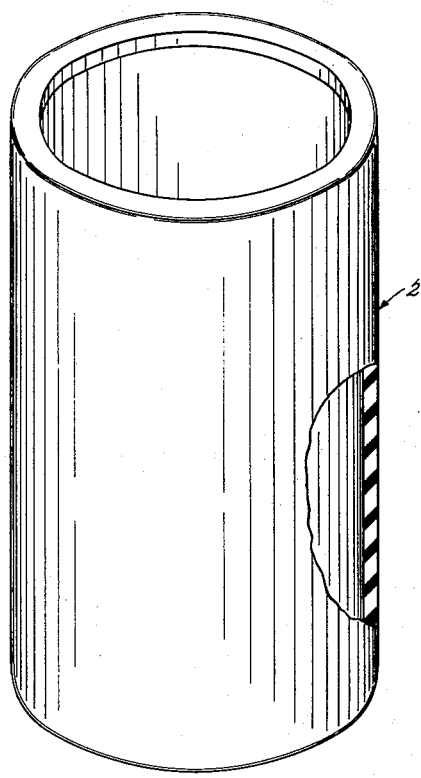

It is also an object of the invention to provide a vulcanized butyl curing element which has a much greater resistance to heat aging and flexing in hot atmosphere than prior art butyl curing elements. These and other objects and advantages of the invention will become more readily apparent from reference to the following detailed description of preferred forms of the invention and to the drawings, wherein FIGURE 1 is a plan view of a conventional toroidal curing element; and FIGURE 2 is a perspective view, partly in section of a curing bladder.

The present invention obtains unexpected improvements through the vulcanization of a butyl rubber composition comprised of a dimethylol-phenol material and substantial amounts of coniferous softening materials such as hydrogenated rosin and the like.

Coniferous softening materials as defined herein are oils, gums, resins, rosin and the like normally useful as softeners and plasticizers in vulcanizable rubbery materials. Such materials play a more important and unexpected roll in the present invention than their conventional function as softener.

Butyl rubber of the type used in the invention may be manufactured by the procedure disclosed by Robert M. Thomas and William J. Sparks in U.S. Patent No. 2,356,128 and which comprised preparing a mixture of an isolefin having from 4 to 8 carbon atoms such as isobutylene in the proportion of from 70 to 99.5 parts with an open-chain conjugated diolefin having from 4 to 7 carbon atoms such as butadiene or isoprene in the proportion of 0 to .5 parts. The mixture is cooled to a relatively low temperature, preferably below −50° C. in the presence of a metal halide catalyst such as aluminum chloride. The polymerization reaction results, after further treatment, in a rubbery vulcanizable material.

The preferred embodiment of the invention employs a butyl rubber composition compounded with a dimethylol phenol and a coniferous softening material. Such a coniferous material may be a rosin derivative or pine oil or one of other softeners to be mentioned hereinafter. One such material is hydrogenated rosin sold under the trade name of "Staybelite Resin." [a] This material is produced by a continuous high pressure catalytic hydrogenation process and is a glass clear, pale amber, non-hygroscopic solid. Hydrogenated rosin has been used in the rubber industry to produce tack and plasticity in natural and synthetic rubber in amounts from 1 to 5% based on the weight of the rubber hydrocarbon. In this use it has served as a processing aid and has imparted desired tack to frictioned stocks and the like. This material has not, however, been used in combination with the phenol-aldehyde resins in butyl rubber compositions wherein a broader range of loading permits an unexpected and valuable result in addition to the normally expected softening action of the lower concentrations.

Phenol-dialcohols useful in the invention are prepared from the reaction of phenol with formaldehyde in the presence of alkali to form resols which are reactive because of terminal methylol groups. Such dialcohols when heated condense to form so-called "condensation polymers" or resins. Both the monomeric and the resinous forms are useful in the present invention. Formation of the dialcohols is taught in U.S. Patent 1,996,069 to Honel while the use of these materials in butyl rubber is taught in U.S. Patent No. 2,364,192.

Example I

The preferred composition of the invention is as follows:

|  | Control | 1 | 2 | 3 | 4 | 5 |
|---|---|---|---|---|---|---|
| Butyl Rubber | [1] 100 |  |  |  |  |  |
| Neoprene W [2] | 3 |  |  |  |  |  |
| Carbon Black | 60 |  |  |  |  |  |
| Amberol St. 137 [3] | 12 |  |  |  |  |  |
| Staybelite Resin |  | 2 | 5 | 10 | 15 | 20 |

[1] All proportions used in the above and other examples herein are based on 100 parts by weight butyl rubber.
[2] Trademark is polychloroprene rubber owned by E. I. du Pont de Nemours & Company, Inc.
[3] Trademark owned by Rohm & Haas Company, Philadelphia, for 2,6-dimethylol octyl phenol.

The above compounds were mixed on a two roll mill in a conventional manner until all the ingredients were dispersed in the butyl rubber. The batch was sheeted from the mill and cured into grooved De Mattia test blocks as described on page 216 of the 1958 Vanderbilt Rubber Handbook.[b] In this test the grooved samples are repeatedly bent on a double position so that cracking finally occurs in the groove. The usual flexing rate is 300 cycles per minute. The specimens are rated according to the inches of cracking for every one inch of cracking in the control. The samples tested gave the following results:

|  | Control | 1 | 2 | 3 | 4 | 5 |
|---|---|---|---|---|---|---|
| Cracking in inches after 50,000 cycles | 1 | 23/32 | 9/32 | 5/32 | 3/32 | 2/32 |

A factory batch of the compound of formula 2 of this example was mixed, formed into a number of curing ---
[a] Trademark of Hercules Powder Company, Wilmington, Delaware.
[b] Published by the R. T. Vanderbilt Company, Inc., 230 Park Avenue, New York, N.Y.

bladders such as shown at 2 in FIGURE 2. A number of bladders also were made of the control stock of Example I. These bladders were used in a Bag-O-Matic type press over and over again to cure tires until each bladder failed. Bladders of the novel composition showed an advantage over the control by curing out an average of 640 tires before failure while the control cured out only 440 tires.

Example II

A second group of stocks were compounded and vulcanized according to the method described in Example I as follows:

|  | Control | 1 | 2 |
|---|---|---|---|
| Butyl Rubber | 100 | | |
| Neoprene W | 3 | | |
| Carbon Black | 60 | | |
| Amberol St. 137 | 12 | | |
| Abitol Resin [1] | | 5 | 10 |

[1] Trade name for a technical hydroabietyl alcohol derived from rosin by Hercules Powder Company, Wilmington, Delaware.

Cracking tests were run as aforedescribed with the following results:

|  | Control | 1 | 2 |
|---|---|---|---|
| Inches of cracking at 28,000 cycles | 1 | 5/32 | 9/32 |

The compounds containing hydroabietyl alcohol had much greater resistance to flexing than had the control compound.

Example III

|  | Control | 1 | 2 | 3 | 4 |
|---|---|---|---|---|---|
| Butyl Rubber | 100 | | | | |
| Neoprene W | 3 | | | | |
| Carbon Black | 60 | | | | |
| Amberol St. 137 | 12 | | | | |
| Staybelite Ester 10 [1] | | 10 | | | |
| Poly Pale Resin [2] | | | 10 | | |
| Pentalyn H [3] | | | | 10 | |
| Turgum S [4] | | | | | 20 |

[1] Glycerol ester of hydrogenated rosin.
[2] Polymerized rosin—Hercules Powder Company.
[3] Pentaerythritol ester of hydrogenated rosin—Hercules Powder Co.
[4] Resin acid terpene blend by J. M. Huber Corporation.

The above stocks were mixed, test pads were cured and De Mattia flex tests were run as aforedescribed with the following results:

|  | Control | 1 | 2 | 3 | 4 |
|---|---|---|---|---|---|
| Inches of cracking at 50,000 cycles | 1 | 3/32 | 3/32 | 5/32 | 3/32 |

Again the butyl rubber stocks with the novel combination of phenol-aldehyde resin with coniferous softeners showed much greater resistance to flexing than did the control stock.

The above compounds each were mixed on a two-roll mill in a conventional manner until all the ingredients were incorporated in the butyl rubber mass. Each plastic mass was removed from the mill and formed by pressure and successfully used as bladders for a Bag-O-Matic press such as described in Soderquist's patent U.S. No. 2,808,618.

Although, in the preferred form of the invention about 10 parts of coniferous material such as hydrogenated rosin is used, from 3 to 20 parts of that material will give improved properties to resin cured butyl compositions.

The amount of dimethylol phenol useful in the invention is from 2 to 20 parts with 12 parts preferred.

Conditions for curing a tire range from 250° F. to approximately 330° F. In one use of a curing bladder of the novel composition the tire vulcanizing press is opened and a tire is slipped axially over the forming bladder 2 (FIG. 2). As the press closes the bladder is axially collapsed and radially expanded to a toroidal shape from the cylindrical shape which it had when the mold was open. After the bladder is formed in the shape of a toroid, high pressure steam at a temperature of approximately 330° F. is injected into the cavity. The high temperature together with the flexing of the bladder as it is collapsed to the toroid shape from the cylindrical shape repeatedly in cure after cure causes the clamped edges of the bladder to crack and eventually to rupture at this location. As has been shown, the novel bladder resists such flexing better than conventional bladders permitting the curing of more tires on each bladder before it fails.

Coniferous materials useful in the invention include, in addition to hydrogenated rosin, rosin itself, glycol esters of rosin acids, glycerine esters of rosin acids, pentaerythritol esters of rosin, pine tar, pine oil, rosin based turpenes, dipentene and other like materials as well as blends and mixtures of these materials. The invention may clearly be used in conventional curing elements as well, such as the type shown at 1 in FIGURE 1.

What is claimed is:

1. A method of chemically modifying a rubbery copolymer of an isoolefin having from 4 to 7 carbon atoms with from .5 to 10% of an aliphatic conjugated diolefin having from 4 to 6 carbon atoms comprising heating 100 parts by weight of said copolymer at a temperature of from 200° to 400° F. for from 5 minutes to 3 hours in admixture with a 2,6-dimethylol-4-hydrocarbon phenol and at least 3 parts of a coniferous softener.

2. A method according to claim 1 wherein the softener is rosin.

3. A method according to claim 1 wherein the softener is present in an amount from 3 to 25 parts based on 100 parts by weight of rubber copolymer.

4. A method according to claim 1 wherein the softener is hydrogenated rosin.

5. An improved vulcanizable rubbery composition comprising 100 parts by weight of a rubbery copolymer of an isoolefin having from 4 to 7 carbon atoms with from .5 to 10 parts by weight of copolymer of an aliphatic conjugated diolefin having from 4 to 8 carbon atoms, a 2,6-dimethylol-4-hydrocarbon phenol, and at least 3 parts of a coniferous softener.

6. A vulcanizable composition according to claim 5 wherein the softener comprises rosin.

7. A vulcanizable composition according to claim 5 wherein the softener comprises hydrogenated rosin.

8. A vulcanizable composition according to claim 5 wherein the softener comprises a glycol ester of rosin.

9. A vulcanizable composition according to claim 5 wherein the softener comprises pine oil.

10. A vulcanizable composition comprising 100 parts by weight of a rubber copolymer of an isoolefin having from 4 to 7 carbon atoms with .5 to 10% of an aliphatic conjugated diolefin having 4 to 8 carbon atoms, a 2,6-dimethylol-4-hydrocarbon phenol and a coniferous softener in an amount of from 3 to 25 parts based on the 100 parts of copolymer.

11. A curing element comprising an annular resilient form adapted to conform to the interior contour of a pneumatic tire casing and defining an interior cavity inflatable with a fluid medium to cause a tire casing to conform to a mold, said bag being comprised of a rubbery copolymer of isobutylene with from .5 to 5% of isoprene vulcanized with from 3 to 20 parts of a condensation polymer of a 2,6-dimethylol-4-alkyl phenol per 100 parts of said rubbery copolymer and from 3 to 20 parts of a coniferous softener.

12. A curing bag according to claim 11 wherein the softener comprises rosin.

13. A curing bag according to claim 11 wherein the softener comprises hydrogenated rosin.

14. A curing bag according to claim 11 wherein the softener comprises a glycol ester of rosin.

15. A curing bag according to claim 11 wherein the softener comprises pine oil.

References Cited in the file of this patent

UNITED STATES PATENTS

| | | |
|---|---|---|
| 2,701,895 | Tawney et al. | Feb. 15, 1955 |
| 2,708,192 | Joesting et al. | May 10, 1955 |
| 2,726,222 | Palmquist et al. | Dec. 6, 1955 |